(12) United States Patent
Mongilio

(10) Patent No.: US 6,463,437 B1
(45) Date of Patent: Oct. 8, 2002

(54) METHOD AND SYSTEM FOR PROCESSING CUSTOMER ISSUES

(75) Inventor: Janet W. Mongilio, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/464,117

(22) Filed: Dec. 16, 1999

(51) Int. Cl.$^7$ .............................................. G06F 17/30
(52) U.S. Cl. ..................................................... 707/10
(58) Field of Search .............................. 707/1–3, 9–10, 707/103, 104.1; 705/8, 14, 26; 709/224, 227

(56) References Cited

U.S. PATENT DOCUMENTS

| | | | |
|---|---|---|---|
| 4,975,841 A | * 12/1990 | Kehnemuyi et al. | 364/401 |
| 5,319,542 A | 6/1994 | King, Jr. et al. | |
| 5,446,883 A | 8/1995 | Kirkbride et al. | |
| 5,694,551 A | 12/1997 | Doyle et al. | |
| 5,862,322 A | 1/1999 | Anglin et al. | |
| 5,920,846 A | 7/1999 | Storch et al. | |
| 5,956,693 A | * 9/1999 | Geerlings | 705/14 |
| 6,032,184 A | * 2/2000 | Cogger et al. | 709/223 |
| 6,148,338 A | * 11/2000 | Lachelt et al. | 709/224 |

* cited by examiner

Primary Examiner—Safet Metjahic
Assistant Examiner—Haythim Alaubaidi

(57) ABSTRACT

An exemplary embodiment of the invention is a method of processing customer issues using a server coupled to a user system by a network. The method includes providing the user system with a customer issue form including a plurality of fields to be completed. The completed customer issue form is provided to the server. Customer issue information from the completed customer issue form is added to a customer issue database. A notification is generated and provided to a vendor authority in response to one of the fields. Another exemplary embodiment of the invention is a method for facilitating return of a product from a customer to a vendor using a server coupled to a user system by a network. The method includes providing the user system with a customer issue form including a plurality of fields to be completed. The completed customer issue form is provided to the server and the server provides the user system with a machine-readable identifier corresponding to a customer issue defined in the customer issue form. The machine-readable identifier is included along with the product returned to the vendor from the customer.

27 Claims, 6 Drawing Sheets

FIG. 3

| CREATION DATE | CASE NUMBER | AMOUNT | CUSTOMER NAME | LOT NUMBER | ISSUE |
|---|---|---|---|---|---|
| 5/28/99 | 25029 | 1000 | A COMPANY | 24-14 | CONDITION |
| 5/28/99 | 25026 | 200 | B COMPANY | 24-14 | COLOR |
| 5/28/99 | 25032 | 300 | C INC. | 34-18 | WET PELLETS |
| 5/27/99 | 24981 | 250 | D COMPANY | 36-15 | CTR. WEIGHT |
| 5/27/99 | 24983 | 200 | E INC. | 36-17 | STREAKS/ HAZE |
| 5/27/99 | 24988 | 150 | F INC. | 36-18 | SECONDARY OPERATION |
| 5/27/99 | 24990 | 52,000 | G COMPANY | 33-66 | CRACKING/ BRITTLENESS |

METHOD AND SYSTEM FOR PROCESSING CUSTOMER ISSUES

BACKGROUND OF THE INVENTION

This invention relates generally to processing customer issues and in particular to a method and system for facilitating processing of customer issues with reduced human intervention. Currently, customer issues are reported to a vendor through a method that requires substantial effort by the vendor. The customer or a vendor field representative contacts the vendor, typically by telephone, and provides a description of the issue and other relevant information. Vendor customer support personnel then enter the customer issue in a database and initiate a customer issue resolution process. This requires assigning the customer issue to vendor personnel, contacting the customer, discussing the issue, etc. The process is time-consuming and labor intensive on the part of the vendor. In addition, errors in the information provided from the customer to the vendor may occur due to the high degree of human involvement. Accordingly, there is a need for a method and system for facilitating processing of customer issues.

BRIEF SUMMARY OF THE INVENTION

An exemplary embodiment of the invention is a method of processing customer issues using a server coupled to a user system by a network. The method includes providing the user system with a customer issue form including a plurality of fields to be completed. The completed customer issue form is provided to the server. Customer issue information from the completed customer issue form is added to a customer issue database. A notification is generated and provided to a vendor authority in response to one of the fields.

Another exemplary embodiment of the invention is a method for facilitating return of a product from a customer to a vendor using a server coupled to a user system by a network. The method includes providing the user system with a customer issue form including a plurality of fields to be completed. The completed customer issue form is provided to the server and the server provides the user system with a machine-readable identifier corresponding to a customer issue defined in the customer issue form. The machine-readable identifier is included along with the product returned to the vendor from the customer.

BRIEF DESCRIPTION OF THE DRAWINGS

FIG. 3 is an exemplary representation of user interface that allows input of customer issue information;

DETAILED DESCRIPTION OF THE INVENTION

An exemplary embodiment of the invention is a system and method for processing customer issues and creating a machine-readable identifier that is used to identify product returned from a customer to a vendor. A user of the system can be any party that interacts with a server over a network, but will typically be a customer of the vendor. Customer issues are initiated by customers or a vendor field representative, and are entered into a customer issue database. The system generates a product return machine-readable identifier, which will be electronically sent to the customer. This machine-readable identifier is then included with returned product to simplify customer issue tracking.

Figure 1:
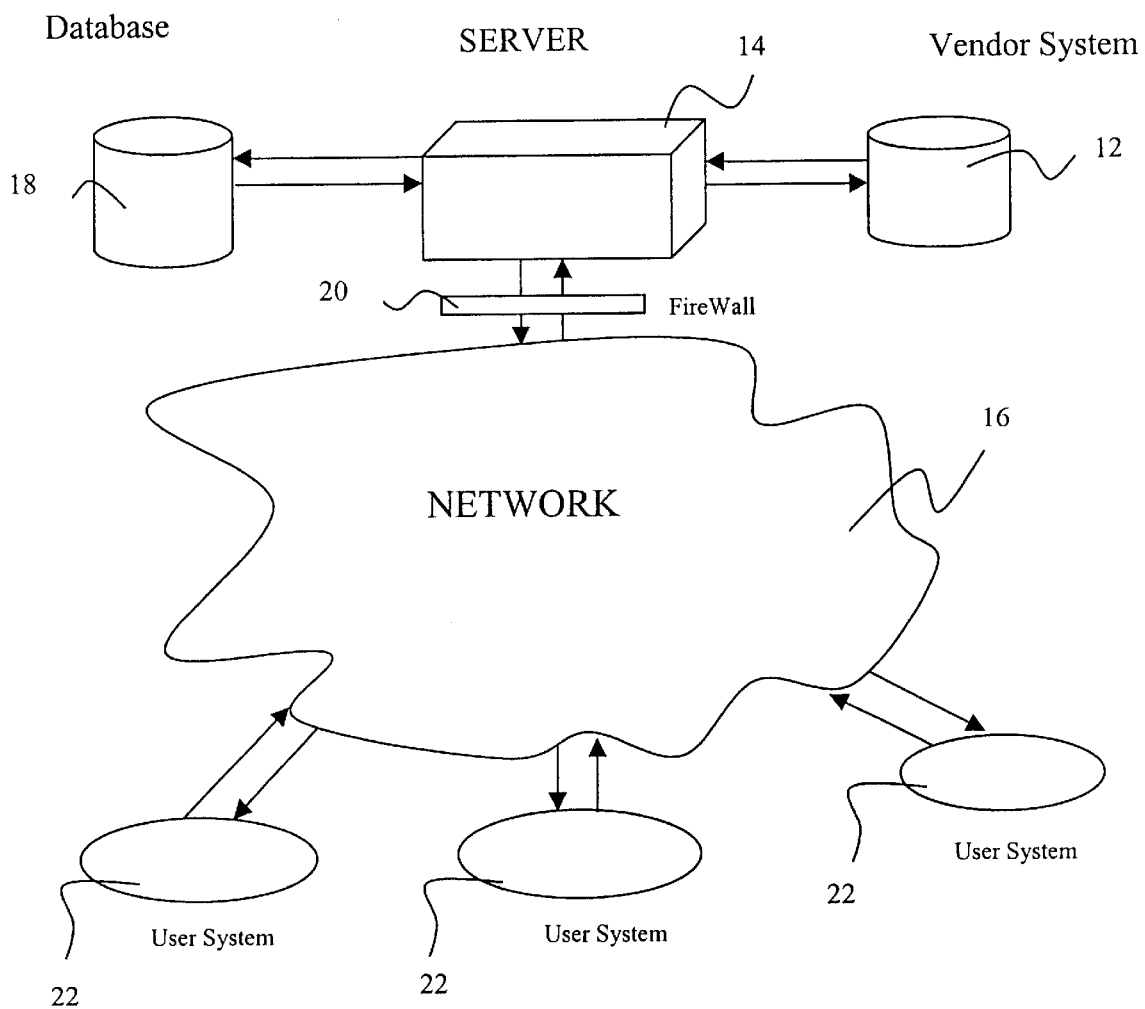
FIG. 1 is a block diagram of a system for processing customer issues in an exemplary embodiment of the invention.

FIG. 1 shows one embodiment of a system, shown generally at 10, for processing customer issues. The vendor system 12 can be a computer that exchanges information with a server 14 and that receives information from the server 14 when customer issue messages are generated by the server 14. The vendor system 12 may be any means for receiving information generated by the server 14 which implements the process described herein. The vendor system 12 can be connected to the server 14 and the database 18 directly, or through a network 16.

The server 14 is a server such as any that are well known in the art. The server 14 can be a computer that executes a computer program contained in a storage medium to perform the processes described herein. As shown in FIG. 1, the server 14 is connected to a network 16, as well as to a customer issue database 18. This dual connectivity allows the server 14 to provide access to customer issue database 18 information to customers who access the server 14 through the network 16.

A firewall 20 can be included internally in the server 14, or externally as shown in FIG. 1. The firewall 20 is designed to prevent unauthorized exchange of information from customer issue database 18 or server 14 to users who access the system through the network 16, or with third parties who access the system. The firewall 20 can be a software program that screens information passing into and out of a server that is connected to a network.

The customer issue database 18 can also be incorporated in the server 14, or it can be located externally in a memory device as shown in FIG. 1. The customer issue database 18 can be hard drive memory space, or any other means for storing information. The customer issue database 18 comprises one or more records, each having multiple fields in which information specific to that record is stored. One record can correspond to one customer issue, or to all of the issues of one customer, among other possibilities.

The network 16 can be any network that connects computers and/or information storage devices. Network examples include, but are not limited to, the following: the Internet, local area networks (LANs), wide area networks (WANs), ethernets, and intranets. In networks that are entirely within a single organizational entity, the need for firewall 20 security may be minimal. When the server 14 is connected to the Internet, however, server 14 integrity is more important, and outside user systems 22 can be restricted from accessing proprietary or sensitive information that is stored on the server 14 or in the database 18.

In one embodiment of the present invention, the network 16 is the Internet, and the user systems 22 are operated by customers of the vendor 12. The user systems 22 may be general-purpose computers executing a computer program (e.g., a web browser) to allow for interaction between the user system 22 and the server 14 over network 16. Typically, the customers have purchased and/or received a product from the vendor and are now faced with an issue with respect to the product. A database record for the sale (e.g., date of sale, purchase order number, customer name, etc.) is stored by the vendor and can be accessed by server 14. The sales record database may be stored in the same memory device that contains the customer issue database 18.

Figure 2:
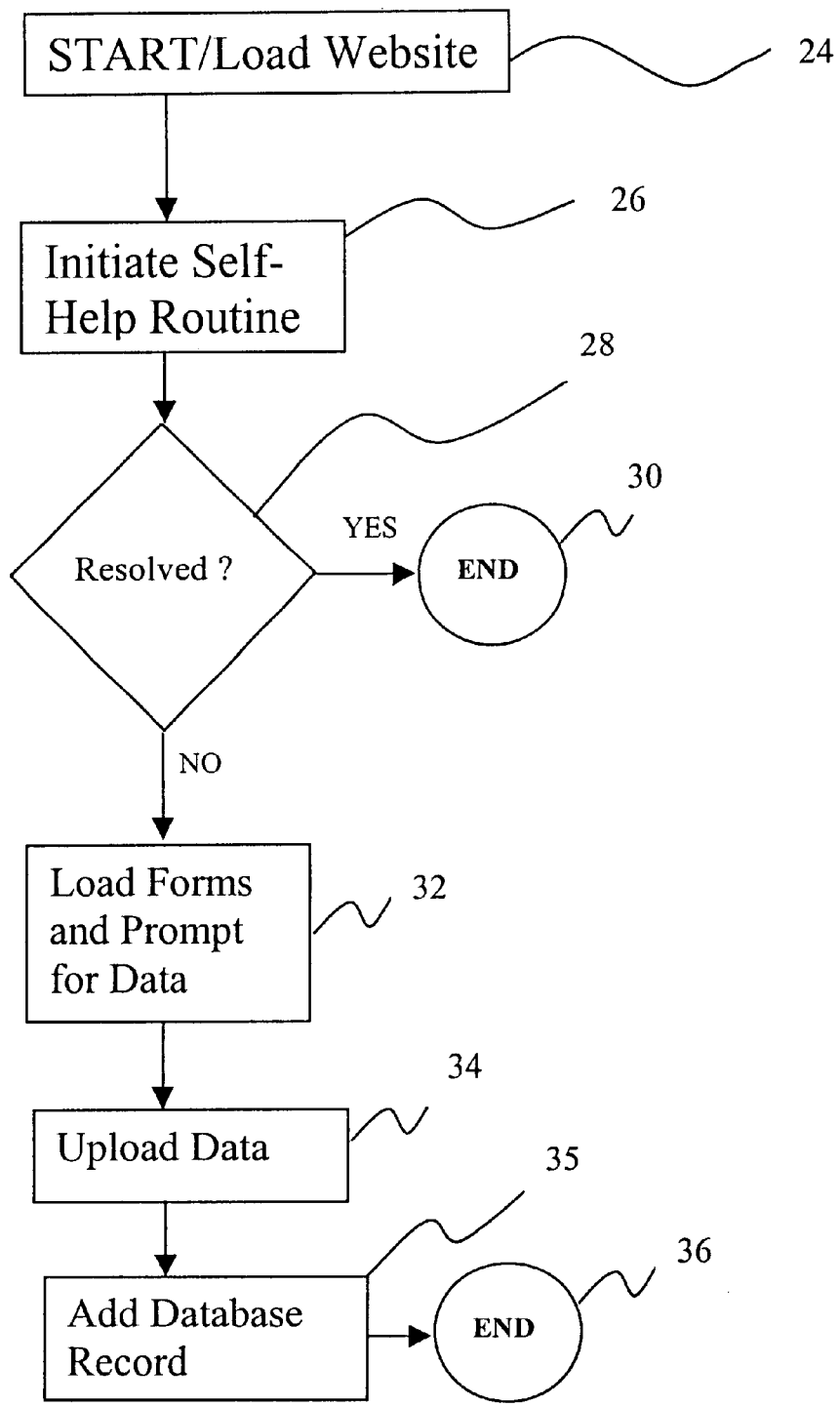
FIG. 2 is a flow chart showing a process by which database records are generated in one embodiment of the present invention.

In an exemplary embodiment, a customer generates a record in the customer issue database 18 by contacting server 14, entering information into a customer issue form provided by server 14, and uploading the customer issue form to the server 14. FIG. 2 is a flow chart of the process for automatic entry of data into the customer issue database 18.

In step 24, the customer begins the process by accessing the server 14 and viewing a vendor website. The user systems 22 may use a known user interface application (e.g., web browser) to interact with server 14. The website can be specially designed to help customers register customer issues, or it can be a part of the vendor's general website. When a customer accesses the server 14 in step 24, a document (webpage) is retrieved by the user system 22. In step 26, the user is prompted to enter a self-help routine. This step can be omitted, but inclusion of step 26 will reduce entries of customer issues in customer issue database 18 and vendor costs in processing the issues. The self-help routine is an automated routine that guides the customer through web page menus in an attempt to resolve the customer issue. For instance, if the customer is having difficulty with complete mold filling of a plastic polymer in an injection molding application of one of the vendor's products, the self-help menu can be used by the customer to navigate to a solution. Injection molding specifications can be verified or altered as directed by the self-help menu in order to overcome the customer issue that caused the initiation of the process.

In step 28, the customer is queried whether the issue is resolved. That is, the customer receives a webpage prompt that asks if further help is needed to resolve the issue. Alternatively, the webpage hyperlink path chosen by the customer during previous website navigation can be used to determine if the customer issue has been resolved. If a yes response is generated in step 28, then flow proceeds to 30, and the process ends. This can involve closing the current webpage or returning the customer to a home page or end page, among other possibilities. If a no response is generated in step 28, then flow proceeds to step 32, where a customer issue form is sent to the user system 22. The customer issue form is a webpage with fields that are filled out by the customer. The fields prompt the customer for information that is pertinent to the customer issue and which will be incorporated into the customer issue database 18.

Figure 3:
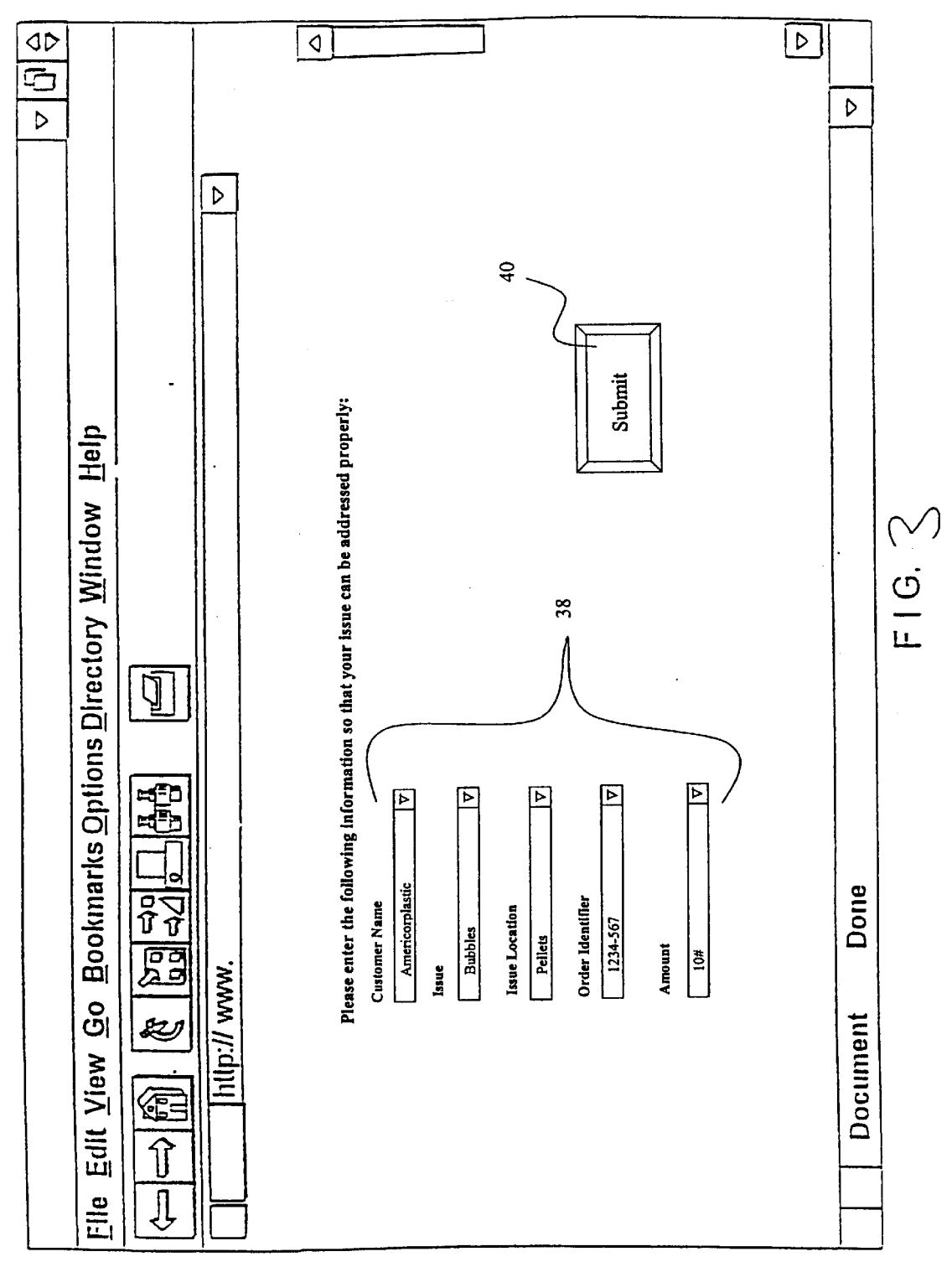

FIG. 3 is an exemplary webpage customer issue form that may be provided to a user system 22. Fields 38 prompt the customer to enter information that is relevant to the customer issue. The fields 38 can be drop down menus, each of which has a list of predetermined possible entries. The customer simply chooses the correct entry from the drop down menu, and that entry is automatically entered into the field associated with the drop down menu. Some or all of the customer issue form can be in the drop down list format. The user of predetermined entries in fields of the customer issue form increases accuracy in the definition of the customer issue and provides for automatic processing by server 14 as described herein. There can also be fields designated for comments by the customer, or otherwise for recording remarks.

A customer name field allows the customer to identify itself. The use of a predetermined list of customer names ensures that only actual customers are permitted to enter customer issues. A list of customer names may be stored in a customer name database. Each time a shipment is sent by the vendor, the customer name from the shipment can be added to the customer name database. Accordingly, the server 14 can automatically update the contents of the drop down menu for the customer name field by accessing the customer name database. The issue field describes the customer issue that needs to be addressed and the order identifier field identifies, for example, the purchase order number for the shipment of product that created the customer issue. The drop down menu for the order identifier field can be generated once the user enters the customer name field. Server 14 can access a database of order identifiers indexed by customer name so that the order identifier field includes entries that are relevant to the customer name (i.e., only order identifiers for that customer are shown).

The fields 38 can also include any of the following issue details: the application for which the product being used, the process the product is subjected to, the phase of the process in which the issue arises, any prior contact with the vendor, the date on which the issue was first discovered by the customer, the customer's prior use and familiarity with the product, the magnitude of the issue, and the regrind percentage or the coloring or compounding (in the case of plastics), or any combination thereof.

When all fields 38 are complete, the customer selects the submit "button" 40, and the user system 22 sends the customer issue form information to the server 14. Referring again to FIG. 2, the data is uploaded and received by the server in step 34, and, in step 35, the server 14 generates a new record in the issue database 18. The server 14 can automatically generate a case number. The server 14 will incorporate the data from the customer issue form into the database 18, as well as any information that is pertinent to the customer issue. For example, the order identifier (e.g., a purchase order number) entered at the user system 22 may be used to retrieve information contained in a sales database which can be incorporated into the customer issue database 18. Information from the original sale record that could be incorporated in the customer issue database 18 includes, but is not limited to, date of sale, date of manufacture, location of manufacture, quantity of goods, and quality information on the goods at the time the goods were shipped. In step 36, the process ends in a manner similar to step 30, and the customer issue has been registered with the vendor. Vendor personnel may periodically check the customer issue database 18 through vendor system 12 to detect the creation of new customer issues. Alternatively, as described in alternate embodiments herein, the server 14 may automatically notify the vendor system 12 of new customer issues.

Figure 4:
FIG. 4 is an exemplary customer issue database.

FIG. 4 shows an exemplary customer issue database that may be generated through the process shown in FIG. 2. The customer issue database can have numerous fields that are not illustrated in the example. The creation date field 42 can be generated automatically by server 14 when the record is created in step 35, or the customer can be prompted to enter creation date into the customer issue form. The case number field 44 is a tracking number that can be created automatically by server 14, as with the creation date field in step 42. Alternatively, information from the sale record or the customer name field 48 can be accessed and used to generate the case number in a manner such that the case number is easily correlated with a particular sale or customer.

The amount field 46 stores information about the quantity of the product that was found to be in issue by the customer and is retrieved from the customer issue form shown in FIG.

3. The amount can be used in conjunction with the sale record to determine the proportion of the product that is an issue. The customer name field 48 can be supplied directly by the customer in the customer issue form fields 38, or can be retrieved from the sale record. The lot number field 50 is similarly supplied by the customer or from previous records such as the sales record or manufacturing record.

The issue field 52 records the actual cause of the customer issue. The drop down list in the customer issue form shown in FIG. 3 can include all known issues as well as a catch-all category such as "other." The server 14 can automatically inform the vendor system 12 if any catch-all categories are chosen in any of the fields 38 as described herein with reference to FIG. 5.

Figure 5:
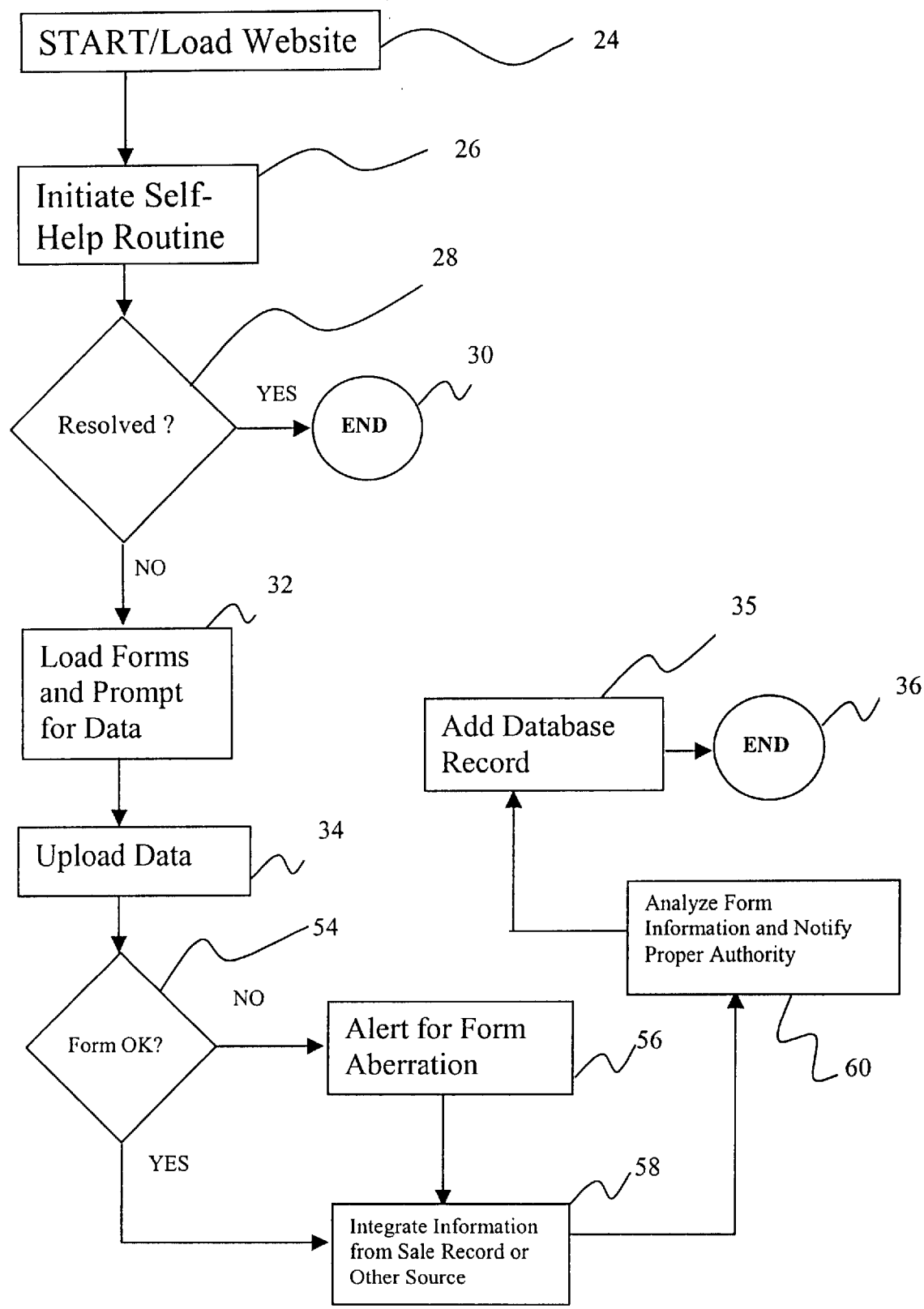
FIG. 5 is a flow chart showing customer issue database generation and customer issue notification in one embodiment of the present invention; and, FIG. 6 is a flow chart showing generation of a machine-readable identifier in one embodiment of the present invention.

Another embodiment of the present invention is shown in FIG. 5. In this embodiment, aberrations in the customer issue form information are automatically reported to the vendor system 12, product sale record information is incorporated into the customer issue database 18, and reports are generated automatically to the proper authority within the vendor's business.

Steps 24–36 in FIG. 5 are similar to those shown in FIG. 2. Step 34 leads to step 54 at which the uploaded information that the customer has entered into the customer issue form is checked. This step can involve checking for catch-all selections that will require further questioning by the vendor, fields that have conflicting or nonsensical selections, or fields that were not properly completed. For example, the customer name and order identifier can be checked with sales record data to confirm that the entries are correct. If any aberrations in the customer issue form information are detected, flow proceeds to step 56 where an alert is generated by the server 14. This alert can be an automatically generated email that is sent to a database administrator or the vendor authority that is responsible for changing incorrect database information. Alternatively, the user system 22 which submitted the customer issue form is notified of the error and the user system 22 is prompted to resubmit the customer issue form. Once the information in the customer issue form is accurate, flow proceeds to step 58.

At step 58, information from sources other than the customer issue form can be incorporated with the customer issue form information. This information can include information from the original sale of the goods now at issue, prior customer issues registered by the same customer, or general information about the customer that is stored in one or more separate databases. For example, information about the standard manufacturing techniques employed by the customer, as identified by the customer name, as they pertain to the product at issue can be integrated with the customer issue form information in the customer issue database 18.

Flow proceeds to step 60, where information generated in the prior steps is analyzed by the server 14, and a report is provided to the proper vendor authority through vendor system 12. The report can be automatically sent to the proper vendor authority through email on the vendor system 12. The proper vendor authority is the vendor authority that will be responsible for resolving the customer issue. In addition, duplicate reports can be sent to any interested party within the vendor's business. The vendor authority responsible for processing the customer issue may be determined based on the customer issue (e.g., all molding issues processed by John Doe), customer name (e.g., all XYZ company issues processed by Mary Doe) or other fields. Customer notification to the user system 22 through email or other means can be performed during this step, with proper identification in the customer notification of the assigned vendor authority. Flow continues to step 35, where the database record is entered into the customer issue database 18.

Figure 6:
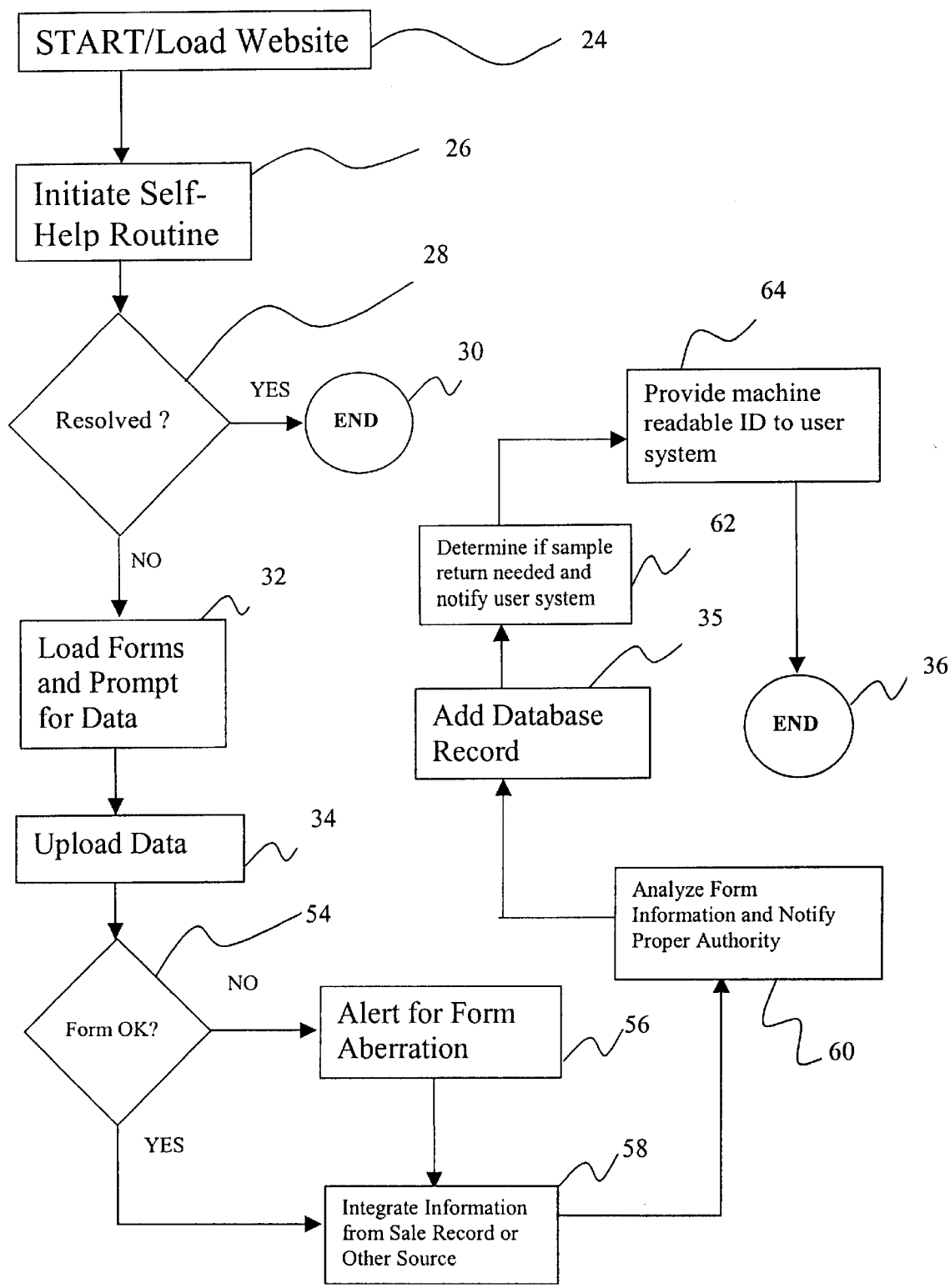

In order to process certain customer issues, a sample of the product needs to be returned to the vendor. For example, if the product is plastic pellets, the customer may return samples of the plastic pellets and samples of parts molded from the plastic pellets to the vendor. In a further embodiment, the server 14 automatically generates a machine-readable identifier that is sent to the user system 22 electronically. The machine-readable identifier can be a bar code or any other code that will allow specific identification of the goods when they are returned to the vendor 12. The machine-readable identifier that is sent to the user system 22 may be affixed or otherwise included with the returned product. FIG. 6 is a flow chart showing the automatic generation of a machine-readable identifier after submission of a customer issue. In step 62, the server 14 determines if the customer issue requires return of samples. Based on certain issues entered in the issue field in the customer issue form, the server 14 determines whether samples need to be returned to the vendor. If sample return is needed, the server 14 notifies the user system 22 of the types of samples (e.g., good product, defective product, molded product, etc.) that need to be sent to the vendor.

In step 64, the server 14 generates a machine-readable identifier unique to the customer issue. The machine-readable identifier may correspond to the case number 44. The machine-readable identifier is forwarded to the user system 22. This machine-readable identifier can be sent to the user system 22 via email, fax, electronic file transfer, or any other method that preserves the integrity of the machine-readable identifier. In the case of email, for example, a bar code image can be sent to the user system 22 automatically by the server 14. After the machine-readable identifier is received by the user system 22, the machine-readable identifier can be printed on paper or other material through standard methods. The physical machine-readable identifier can then be affixed to the samples when the samples are returned to the vendor. Included with the machine-readable identifier may be instructions regarding the samples to be returned. For example, if problems are encountered with a finished item that is made from the vendor's product, then the instructions will include instructions detailing the quantity and type of sample product that should be returned to the vendor. The inclusion of instructions reduces issue resolution time by clarifying what should be returned by the customer to the vendor. When the samples are received by the vendor, the machine-readable identifier can be read by the vendor to correlate the samples with a customer issue in the customer issue database.

This system limits database generation and maintenance costs for the vendor, and provides users with a highly efficient and automated method for registering and processing product issues. The automatic machine-readable identifier forwarding process reduces issue processing time when the returned goods are inspected by the vendor, and simplifies the identification of returned goods.

As described above, the invention can be embodied in the form of computer-implemented processes and apparatuses for practicing those processes. The invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention.

The invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method of processing customer issues using a server coupled to a user system by a network, the method comprising:

providing the user system with a customer issue form including a plurality of fields to be completed, wherein one of said plurality of fields is a order identifier field identifying an order of a product by a customer from a vendor and another one of said plurality of fields is an issue field identifying an issue related to the product;

receiving a completed customer issue form at the server;

adding customer issue information from the completed customer issue form to a customer issue database;

generating a notification to a vendor authority in response to one of said fields;

retrieving sales information from a sales database in response to said order identifier field, said sales information including a date of manufacture of the product and location of manufacture of the product; and storing the sales information in the customer issue database.

2. The method of claim 1 wherein:

one of said plurality of fields is a customer name field; and said generating a notification to the vendor authority includes the server sending a message to the vendor authority responsible for resolving customer issues for a customer identified in said customer name field.

3. The method of claim 1 wherein:

one of said plurality of fields is a customer issue field; and said generating a notification to the vendor authority includes the server sending a message to the vendor authority responsible for resolving customer issues for an issue identified in said customer issue field.

4. The method of claim 1 wherein:

one of said plurality of fields is a customer lame field including a list of a plurality of predetermined customer names;

said list of a plurality of predetermined customer names being updated by the server based on a customer name database accessible by the server.

5. The method of claim 1 wherein:

said generating a notification to a vendor authority includes sending an e-mail to a vendor system.

6. A storage medium encoded with machine-readable computer program code for processing customer issues using a server coupled to a user system by a network, the storage medium including instructions for causing the server to implement a method comprising:

providing the user system with a customer issue form including a plurality of fields to be completed, wherein one of said plurality of fields is a order identifier field identifying an order of a product by a customer from a vendor and another one of said plurality of fields is an issue field identifying an issue related to the product;

receiving a completed customer issue form from the user system;

adding customer issue information from the completed customer issue form to a customer issue database;

generating a notification to a vendor authority in response to one of said fields;

retrieving sales information from a sales database in response to said order identifier field, said sales information including a date of manufacture of the product and location of manufacture of the product; and storing the sales information in the customer issue database.

7. The storage medium of claim 8 wherein:

one of said plurality of fields is a customer name field; and said generating a notification to the vendor authority includes the server sending a message to the vendor authority responsible for resolving customer issues for a customer identified in said customer name field.

8. The storage medium of claim 6 wherein:

one of said plurality of fields is a customer issue field; and said generating a notification to the vendor authority includes the server sending a message to the vendor authority responsible for resolving customer issues for an issue identified in said customer issue field.

9. The storage medium of claim 6 wherein:

one of said plurality of fields is a customer name field including a list of a plurality of predetermined customer names;

said list of a plurality of predetermined customer names being updated by the server based on a customer name database accessible by the server.

10. The storage medium of claim 6 wherein:

said generating a notification to a vendor authority includes sending an e-mail to a vendor system.

11. A system for processing customer issues, the system comprising:

a server for generating a customer issue form including a plurality of fields to be completed, wherein one of said plurality of fields is a order identifier field identifying an order of a product by a customer from a vendor and another one of said plurality of fields is an issue field identifying an issue related to the product;

said server coupled to a user system by a network, said server receiving a completed customer issue form from said user system; and a customer issue database coupled to said server, said server adding customer issue information from the completed customer issue form to a customer issue database;

said server generating a notification to a vendor authority in response to one of said fields;

said server retrieving sales information from a sales database in response to said order identifier field, said sales information including a date of manufacture of the product and location of manufacture of the product; and said server storing the sales information in the customer issue database.

12. The system of claim 11 wherein:

one of said plurality of fields is a customer name field; and said generating a notification to the vendor authority includes the server sending a message to the vendor authority responsible for resolving customer issues for a customer identified in said customer name field.

13. The system of claim 11 wherein:

one of said plurality of fields is a customer issue field; and said generating a notification to the vendor authority includes the server sending a message to the vendor authority responsible for resolving customer issues for an issue identified in said customer issue field.

14. The system of claim 11 wherein:

one of said plurality of fields is a customer name field including a list of a plurality of predetermined customer names;

said list of a plurality of predetermined customer names being updated by the server based on a customer name database accessible by the server.

15. The system of claim 11 further comprising:

a vendor system coupled to said server;

wherein said generating a notification to a vendor authority includes sending an e-mail to said vendor system.

16. The method of claim 1 wherein:

one of said plurality of fields is an amount field, said amount field identifying the amount of the product experiencing the issue; and said sales information including the total amount of product in the order.

17. The method of claim 16 further comprising:

determining a proportion of product experiencing the issue based on the amount of amount of the product experiencing the issue and the total amount of product in the order.

18. The method of claim 1 further comprising:

requesting the customer to return a sample of the product experiencing the issue.

19. The method of claim 18 further comprising:

providing the user system with a machine-readable identifier, said machine-readable identifier accompanying the sample of the product being returned.

20. The storage medium of claim 6 wherein:

one of said plurality of fields is an amount field, said amount field identifying the amount of the product experiencing the issue; and said sales information includes the total amount of product in the order.

21. The storage medium of claim 20 further comprising instructions for causing the server to implement:

determining a proportion of product experiencing the issue based on the amount of amount of the product experiencing the issue and the total amount of product in the order.

22. The storage medium of claim 6 further comprising instructions for causing the server to implement:

requesting the customer to return a sample of the product experiencing the issue.

23. The storage medium of claim 21 further comprising instructions for causing the server to implement:

providing the user system with a machine-readable identifier, said machine-readable identifier accompanying the sample of the product being returned.

24. The system of claim 11 wherein:

one of said plurality of fields is an amount field, said amount field identifying the amount of the product experiencing the issue; and said sales information including the total amount of product in the order.

25. The system of claim 24 wherein:

said server determines a proportion of product experiencing the issue based on the amount of amount of the product experiencing the issue and the total amount of product in the order.

26. The system of claim 11 wherein:

said sever generates a request for the customer to return a sample of the product experiencing the issue.

27. The system of claim 26 wherein:

said server provides the user system with a machine-readable identifier, said machine-readable identifier accompanying the sample or the product being returned.

* * * * *